United States Patent
Tsuji

(10) Patent No.: US 7,218,421 B2
(45) Date of Patent: May 15, 2007

(54) IMAGE READING DEVICE

(75) Inventor: Junichi Tsuji, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 994 days.

(21) Appl. No.: 10/224,366

(22) Filed: Aug. 21, 2002

(65) Prior Publication Data
US 2003/0053158 A1    Mar. 20, 2003

(30) Foreign Application Priority Data
Aug. 28, 2001   (JP) .............................. 2001-257299
Jun. 4, 2002    (JP) .............................. 2002-162867

(51) Int. Cl.
*H04N 1/409* (2006.01)
(52) U.S. Cl. .................................... 358/3.26; 358/3.27
(58) Field of Classification Search ...... 358/3.26–3.27, 358/1.9, 2.1, 468; 382/149, 254, 275
See application file for complete search history.

(56) References Cited

U.S. PATENT DOCUMENTS 5,917,935 A *  6/1999 Hawthorne et al. ......... 382/149
6,473,535 B1 * 10/2002 Takaoka .................... 382/274
6,757,083 B1 *  6/2004 Nakamura .................. 358/487

FOREIGN PATENT DOCUMENTS

| JP | 2001-8008    | 1/2001 |
| JP | 2001-16413   | 1/2001 |
| JP | 2001-24884   | 1/2001 |
| JP | 2001-036749  | 2/2001 |
| JP | 2001-111795  | 4/2001 |
| JP | 2001-144908  | 5/2001 |

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

An image reading device includes a light source for illuminating an image in a developed photo film by applying illuminating light thereto. An area CCD reads the image by photoelectrically detecting the illuminating light reflected by, or transmitted through, the developed photo film, to obtain image data respectively of pixels. An input unit inputs information of a photo film type, printing size or printing magnification. A determiner determines whether the photo film type, printing size or printing magnification satisfies a predetermined data correcting condition related to image data correction. An image processor extracts a group of inappropriate pixels from the pixels by checking the image data if the photo film type, printing size or printing magnification satisfies the data correcting condition, and corrects the image data of the inappropriate pixel group.

17 Claims, 6 Drawing Sheets

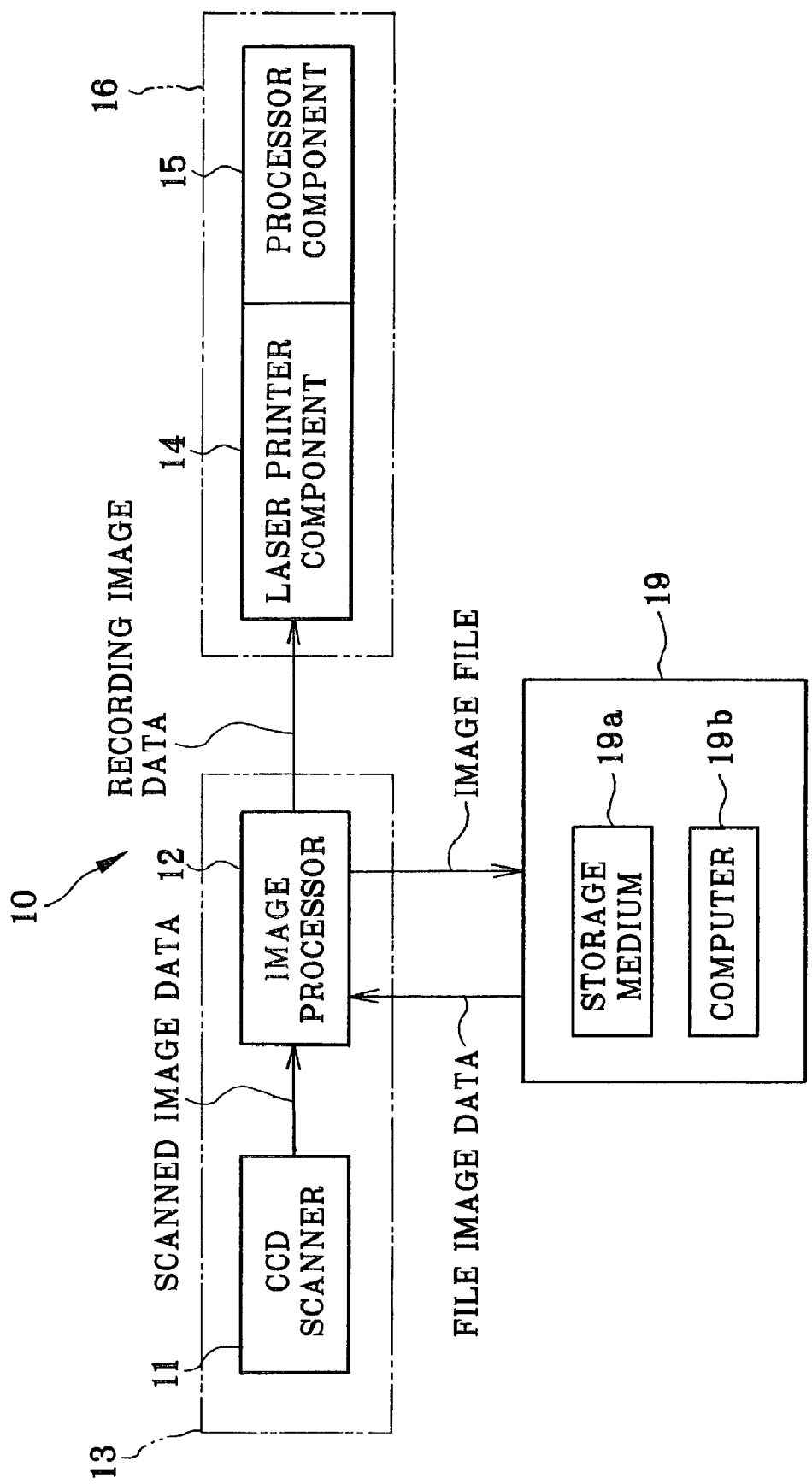

| PRINTING SIZE (mm) FROM 135 TYPE | LEVEL OF SCRATCH SUPPRESSION | | | |
|---|---|---|---|---|
| | HIGH | MEDIUM | LOW | ZERO |
| 89×127 | — | — | — | ○ |
| 102×152 | — | — | — | ○ |
| 127×178 | — | — | ○ | — |
| 204×254 | — | ○ | — | — |
| 254×304 | ○ | — | — | — |

FIG. 6

| PRINTING SIZE (mm) FROM 240 TYPE | LEVEL OF SCRATCH SUPPRESSION | | | |
|---|---|---|---|---|
| | HIGH | MEDIUM | LOW | ZERO |
| 89×127 | — | — | — | ○ |
| 102×152 | — | — | — | ○ |
| 89×254 | — | — | ○ | — |
| 204×254 | — | ○ | — | — |
| 254×304 | ○ | — | — | — |

FIG. 7

| PRINTING SIZE (mm) FROM 120 TYPE | LEVEL OF SCRATCH SUPPRESSION | | | |
|---|---|---|---|---|
| | HIGH | MEDIUM | LOW | ZERO |
| 102×152 | — | ○ | — | — |
| 127×178 | — | ○ | — | — |
| 204×254 | ○ | — | — | — |
| 254×304 | ○ | — | — | — |
| 304×406 | ○ | — | — | — |

IMAGE READING DEVICE

BACKGROUND OF THE INVENTION

1. Field of the Invention

The present invention relates to an image reading device. More particularly, the present invention relates to an image reading device capable of precisely reading an image by correction of inappropriate portions.

2. Description Related to the Prior Art

There is an image reading device, which includes an image sensor such as CCD, and reads a frame image from developed photo film or an original of other types. In the image reading device, a light source having a lamp applies light to the original, from which the reflected light is read by the image sensor to obtain digital image data. The image data is subjected to enlargement, compression, compensation and other treatment of image processing. After this, the image frame is printed to photographic paper or other recording medium according to the image data being processed.

The image reading device reads the frame image for two times, namely by pre-scanning and fine scanning for the purpose of precise reading of the frame image. After the pre-scanning, a reading condition is determined according to density of the frame image and the like. In the fine scanning the frame image is read according to the determined reading condition. To protect the image reading from influence due to a scratch or dust stuck on the original, light from the light source is diffused and applied to the original. However, the influence of the scratch or dust of the original cannot be reduced completely even with the diffusion of the light applied to the original. Image reading at high precision is impossible.

There is a suggestion in JP-A 2001-016413, JP-A 2001-111795 and JP-A 2001-144908 in which the light source specialized for emitting infrared rays is disposed for detecting the scratch or dust from the original. The infrared rays after being reflected is detected to obtain infrared image data. According to this, the scratch or dust of the original is detected and checked, to correct image data obtained by the fine scanning.

In order to detect the scratch or dust by use of the infrared rays from a surface of the original, it is necessary to apply the infrared rays to the original in addition, and also to effect calculation for the scratch suppression according to the infrared image data. The processing of the scratch suppression takes considerable time, to lower efficiency in reading the frame image. A high-speed processing type of arithmetic operation processing device may be used. However, such a device is very expensive, to raise the manufacturing cost remarkably.

SUMMARY OF THE INVENTION

In view of the foregoing problems, an object of the present invention is to provide an image reading device capable of precisely reading an image by efficient correction of inappropriate portions.

In order to achieve the above and other objects and advantages of this invention, an image reading device includes a light source for illuminating an image in an original by applying illuminating light thereto. An image sensor reads the image by photoelectrically detecting the illuminating light reflected by, or transmitted through, the original, to obtain image data respectively of pixels. An input unit inputs first information related to conditioning. A determiner determines whether the first information satisfies a predetermined data correcting condition related to image data correction. An image processor extracts an inappropriate pixel group of inappropriate pixels from the pixels by checking the image data if the first information satisfies the data correcting condition, and corrects the image data of the inappropriate pixel group.

Furthermore, a controller effects calculation to obtain corrected image data for being used with the inappropriate pixel group according to the image data of appropriate pixels distinct from the inappropriate pixel group among the pixels.

The first information is at least one of information of a type of the original, information of a printing size of the image, and information of a printing magnification of the image.

The light source further applies inspecting rays to the image in the original. The image sensor photoelectrically detects the inspecting rays reflected by, or transmitted through, the original for each of the pixels, to obtain inspection image data. The image processor checks whether the inspection image data is appropriate or inappropriate for each of the pixels, and determines the inappropriate pixel group by specifying pixels associated with the inspection image data being inappropriate among the pixels.

The image data associated with the inappropriate pixel group is corrected at a predetermined data correcting level, and the data correcting level is variable according to the first information.

The data correcting level is higher according to largeness in the printing size of the image represented by the first information.

The light source includes an illuminating light emitting section for applying the illuminating light to the original. An inspecting ray emitting section applies the inspecting rays to the original.

The original is a developed photo film, and the type is a photo film type.

The inspecting ray emitting section includes plural infrared emitting diodes, and the inspecting rays are infrared rays.

The printing magnification satisfies the data correcting condition when higher than a predetermined magnification, and the printing size satisfies the data correcting condition when larger than a predetermined size.

The inappropriate pixel group is associated with a scratched portion of the original.

The determiner checks whether the photo film type is a predetermined type, and thereafter checks whether the printing magnification or the printing size is higher than the predetermined magnification or the predetermined size.

BRIEF DESCRIPTION OF THE DRAWINGS

The above objects and advantages of the present invention will become more apparent from the following detailed description when read in connection with the accompanying drawings, in which:

FIG. 1 is a block diagram illustrating a digital laboratory system;

FIG. 6 is a table illustrating plural levels of scratch suppression and printing sizes in using the photo film of 240 type is used;

FIG. 7 is a table illustrating plural levels of scratch suppression and printing sizes in using the photo film of 120 type is used.

DETAILED DESCRIPTION OF THE PREFERRED EMBODIMENT(S) OF THE PRESENT INVENTION

Figure 2A:
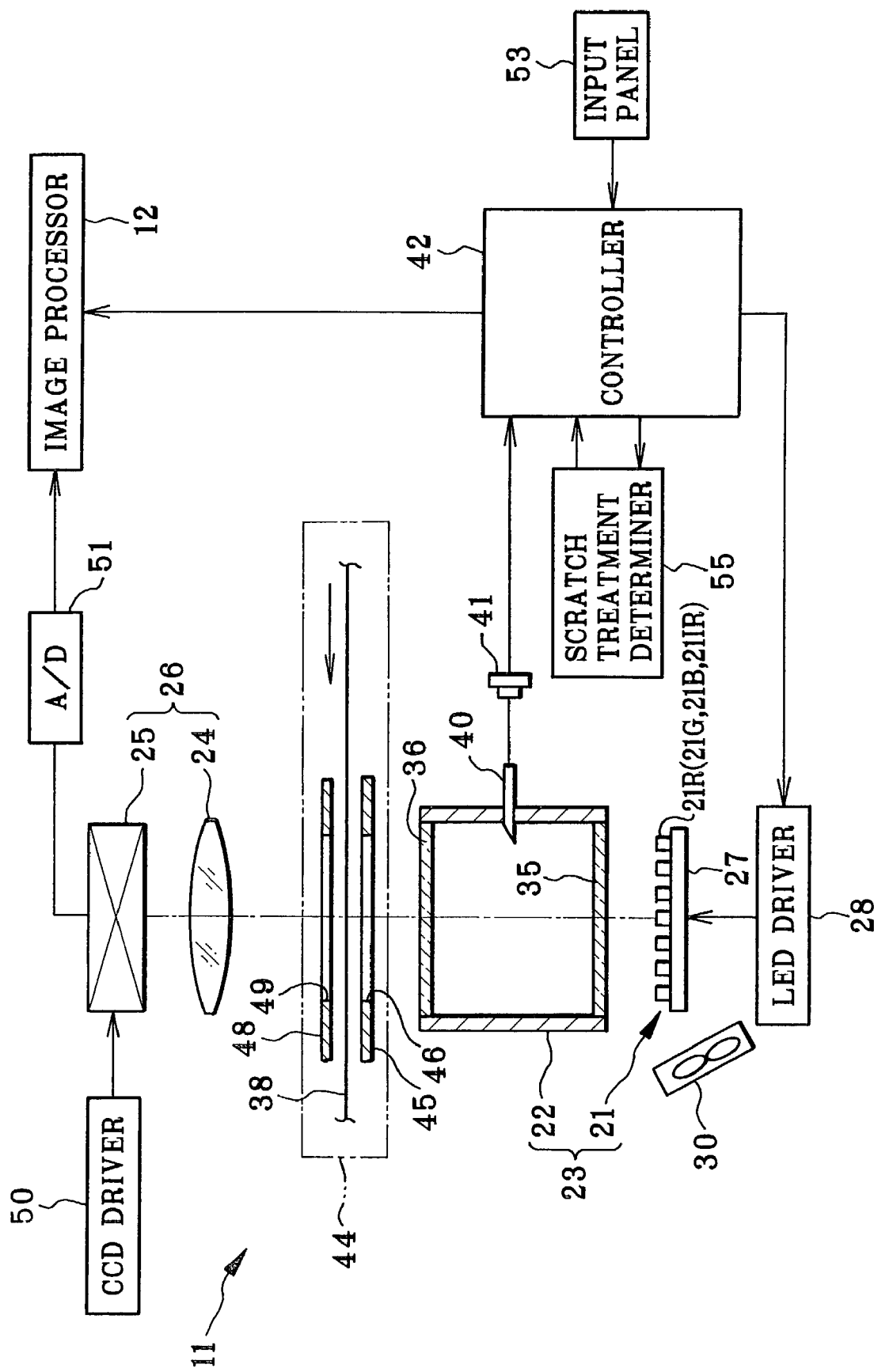
FIG. 2A is a schematic view illustrating a CCD scanner.

In FIG. 1, a digital laboratory system 10 including an image reading device is illustrated. The digital laboratory system 10 is constituted by an image reading device 13 and an image outputting device 16. The image reading device 13 includes a CCD scanner 11 and an image processor 12. The image outputting device 16 includes a laser printer component 14 and a processor component 15.

The CCD scanner 11 is used for reading an image recorded on developed photo film such as negative photo film, reversal photo film, and the like. Types of the photo film include 135 type, IX240 type, 110 type, and also Brownie photo film of 120 size and 220 size (Brownie sizes). Furthermore, a mount carrier of a specialized type can be combined with the CCD scanner 11, so as to read an image in photo film in a form of a slide mount.

The image processor 12 subjects the image data to image processing for correction of plural kinds, the image data being output by the CCD scanner 11. Upon pre-scanning, the image processor 12 effects arithmetic operation of a reading condition for fine scanning by calculation of image data obtained by the pre-scanning. According to the reading condition, an original image in the photo film is finely scanned, and subjected to image processing. After this, the image data is output to the laser printer component 14 as recording image data. Examples of the image processing are gray balance adjustment, gradation correction, density adjustment (brightness adjustment), light source type correction of a light source according to a matrix (MTX), chroma adjustment of an image (color adjustment), and the like. Other examples of the image processing are electronic zooming processing, image dodging processing (compressing and extending of density dynamic range), and sharpness processing. For the purpose of processing of those, various elements are used, including a low-pass filter, adder, look-up table memory (LUT), matrix (MTX) and the like. Those are suitably combined with one another, to effect averaging, and interpolating calculation.

An external device 19 can be connected with the image processor 12, which supplies it with the processed image data as image file. For example, a storage medium 19a is used, such as a memory card, CD-ROM or the like, and stores the image file written thereto. A computer 19b or terminal device as information processing machine can be connected with the image processor 12 by a communication line. The image processor 12 sends the image file to the computer 19b.

The laser printer component 14 includes laser light sources of colors of red, green and blue, and a modulator. The modulator modulates laser beams from the laser light source according to recording image data, and scans and exposes photographic paper by means of the modulated beams to record an image. The processor component 15 subjects the exposed photographic paper to treatment of development, bleaching/fixation, water washing and drying as steps included in the photographic processing. Therefore, a visible image is formed on the photographic paper.

Figure 2B:
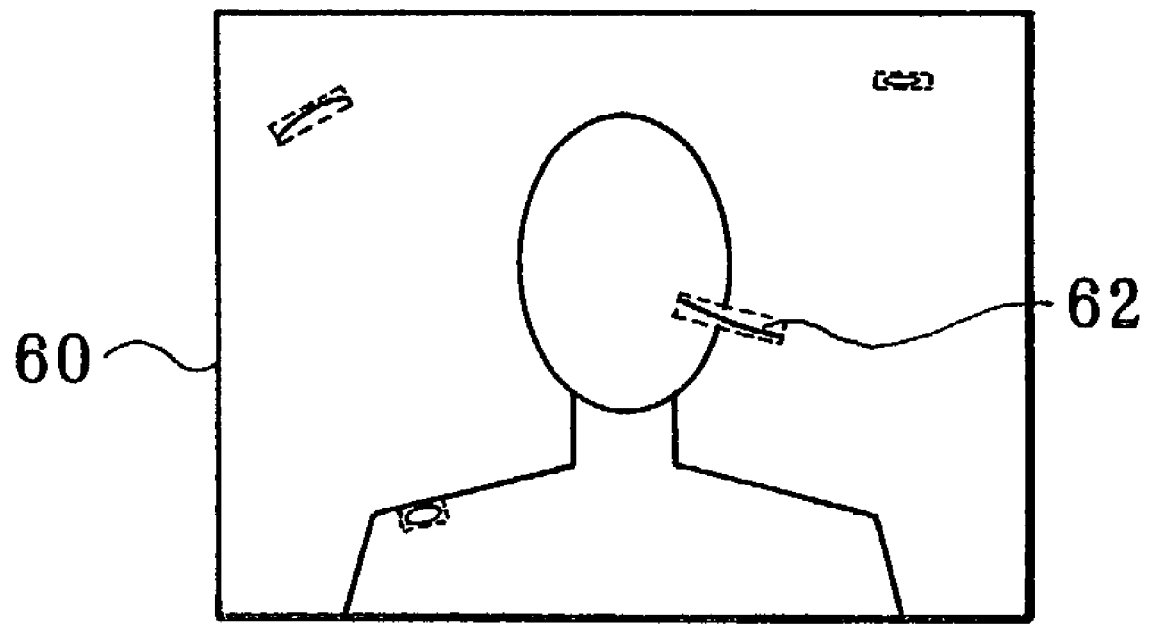
FIG. 2B is a plan illustrating a frame image in which a scratched portion exists.

In FIG. 2, an optical structure of the CCD scanner 11 is illustrated. The CCD scanner 11 is constituted by an illuminating component 23 and an image reading component 26. The illuminating component 23 includes a light source 21 and a light diffusing box 22. The image reading component 26 includes a scanner lens unit 24 and an area CCD 25 as image sensor.

The light source 21 includes an LED board 27 and groups of light-emitting diodes (LEDs) mounted thereon in a matrix form. The LED groups include red light-emitting diodes (LEDs) 21R, green light-emitting diodes (LEDs) 21G, blue light-emitting diodes (LEDs) 21B, and infrared emitting diodes (IREDs) 21IR. The red, green and blue LEDs 21R, 21G and 21B operate as an illuminating light emitting section. The IREDs 21IR operate as an inspecting ray emitting section. Each group of the red LEDs 21R, the green LEDs 21G, the blue LEDs 21B and the IREDs 21IR is individually actuated to apply red light, green light, blue light and infrared rays to the photo film. An LED driver 28 drives the light source 21.

The IREDs 21IR are used for detecting a scratched portion 62, defects, dust and the like on a surface of the photo film. See FIG. 2B. IR image data is obtained by a combination of the original image and the IREDs 21IR, and is sent to the image processor 12 together with the three-color image data of the red, green and blue colors. The image processor 12 extracts pixels included in those in the entirety of a frame image 60 at points where a level of the IR image data is lower then a threshold level, estimates them as inappropriate because of the scratched portion 62, defects, dust or the like. The inappropriate pixels are subjected to operation of interpolation by use of three-color image data of pixels around those, to compensate for an error in the image data. Thus, the image processor 12 operates for compensation of inappropriate pixels. The method used herein for suppression of reproducing the scratched portion 62 in the image processor 12 is at least one of those disclosed in JP-A 2001-008005, JP-A 2001-024884 and JP-A 2001-036749.

A cooling fan 30 is disposed under the light source 21. It is likely that a light amount and light-emitting spectrum change according to a change in the temperature. Thus, the fan 30 is driven to rotate to keep the temperature of the light source 21 within a predetermined range. The light amount and light-emitting spectrum can be kept regular. A temperature sensor (not shown), for example a thermistor, is disposed close to the light source 21, outputs information of detected temperature, according to which driving of the fan 30 is controlled.

The light diffusing box 22 is disposed above the light source 21. An entrance diffusing plate 35 is included in the light diffusing box 22, extends perpendicular to the light path, and receives entry of the light. An exit diffusing plate 36 is included in the light diffusing box 22, extends perpendicular to the light path, and causes the light to exit from the light diffusing box 22 after the diffusing operation. A developed photo film 38 as original is supported on a plane in an image reading position. The exited light is applied to the photo film 38 being positioned. The light emitted by the light diffusing box 22 is converted into diffused light, so that irregularity is reduced in an amount of light applied to the photo film 38. The light for illuminating the photo film 38 can be uniform. Even though there are scratched portions 62 on the photo film 38, the scratched portions 62 can be less conspicuous.

A light conducting pipe 40 is connected with the light diffusing box 22. The light conducting pipe 40 receives light in the light diffusing box 22, and guides the light. A photoelectric converting element or photo sensor 41 is supplied with the light by the light conducting pipe 40. The photoelectric converting element 41 detects the light photoelectrically. A controller 42 is supplied by the light in a feedback manner, controls an amount of output light of the LEDs, to suppress changes in brightness of light in the actuation.

A photo film carrier 44 or photo film holder is disposed above the light diffusing box 22. The photo film 38 is fed in the photo film carrier 44 by movement one frame after another, to position each of image frames in the image reading position defined at the light path for the purpose of image reading.

A lower mask plate 45 is disposed under the photo film carrier 44. The lower mask plate 45 has a frame shape. A lower mask opening 46 is formed in the center of the lower mask plate 45. The lower mask plate 45 is so disposed as to set the center of the lower mask opening 46 on the optical axis of printing light path.

An upper mask plate 48 is disposed on a plane higher than the photo film 38. The upper mask plate 48 also has a frame shape similar to the lower mask plate 45. While the photo film 38 is moved, the upper mask plate 48 is kept up away from the feeding path in the photo film carrier 44. To read a frame image 60, the upper mask plate 48 is shifted down, and squeezes the photo film 38 between it and the lower mask plate 45 in the image reading position. Also, an upper mask opening 49 is formed in the upper mask plate 48.

The scanner lens unit 24 and the area CCD 25 are disposed higher than the photo film carrier 44 and arranged on the light path L. The scanner lens unit 24 focuses the image frame 60 of the photo film 38 on to a light receiving plane of the area CCD 25. A lens motor (not shown) moves the scanner lens unit 24 in a direction of the light path L, to change a magnification. A distance (conjugate length) between the photo film 38 and the area CCD 25 is changed for focusing of the optical system.

The area CCD 25 is constituted by a plurality of CCD cells arranged in a matrix form. A CCD driver 50 drives the area CCD 25, which reads the image frame 60 in the photo film 38 for each of the three colors, to obtain color image data. There is an A/D converter 51, by means of which the image data of the three colors are sent to the image processor 12. For the image reading, there are two steps which are pre-scanning of low definition, and fine scanning of high definition. Pre-scanning is performed before fine scanning, to obtain pre-scanned image data with which a reading condition at the time of the fine scanning is determined.

An input panel 53 is used to input information of conditions, including a type of the photo film 38, a printing size, a printing magnification and the like. A scratch treatment determiner 55 is supplied with the information of the conditions by the controller 42. The information of the conditions is input manually by an operator at the input panel 53. Note that the information of the conditions may be input automatically by means of printing command data which may be previously stored in an LSI card.

The scratch treatment determiner 55 stores table data of various information, including a type of the photo film 38, a printing size, a printing magnification, use or lack of the scratch suppressing treatment by use of the IREDs 21IR. According to the condition information input by the input panel 53, it is determined whether the scratch suppression by means of the IREDs 21IR should be designated. In the fine scanning, the red, green and blue LEDs 21R, 21G and 21B are driven to emit light. After this, the IREDs 21IR are driven to emit infrared rays. If the photo film 38 is a Brownie photo film or reversal photo film of 135 type, the scratch treatment determiner 55 determines the designation of the scratch suppressing treatment irrespective of the printing size and the printing magnification.

In the case of 135 type of negative photo film and the IX240 type of photo film, it is checked whether the IREDs 21IR should be driven according to the input information of the printing magnification and printing size of the respective images. If the printing magnification X is higher than a reference magnification S that is for example 4.5 times, then it is determined to use the scratch suppressing process by driving the IREDs 21IR. If the printing size is equal to or more than a postcard size (4R) of 102×152 mm, then it is determined to use the scratch suppressing process. If the printing size is a high-vision size (H) of 89×158 mm, a panoramic size (P) of 89×254 mm, and an L size of 89×127 mm, then it is determined not to use the scratch suppressing process. Those results of the determination are transmitted to the controller 42 and the image processor 12. According to the results, the controller 42 controls emission of the IREDs 21IR. Note that it is possible to modify the two states for determining use or lack of the scratch suppressing process in a manner different from the above.

Figure 3:
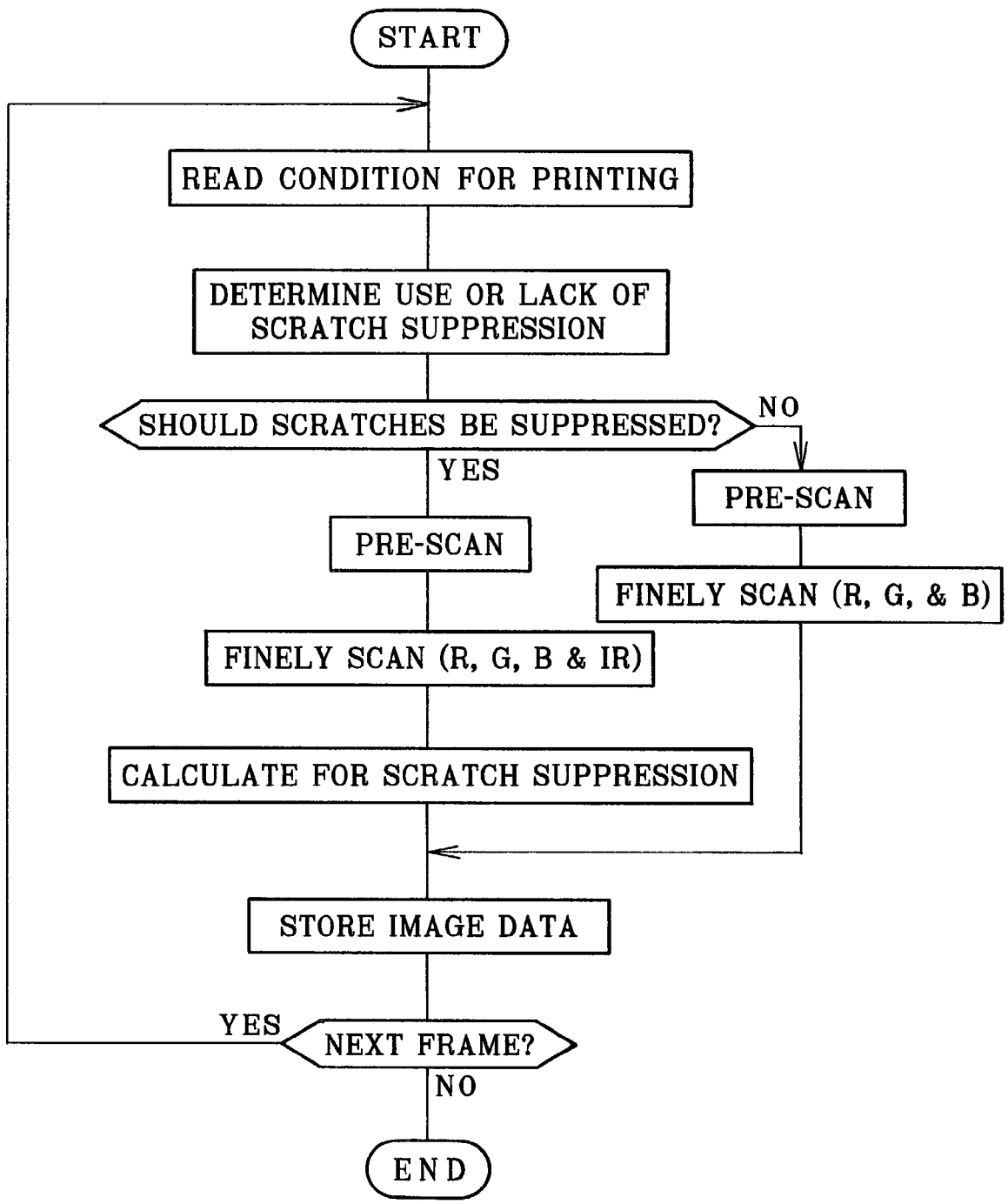
FIG. 3 is a flow chart illustrating a process of image reading.
Figures 4, 5:
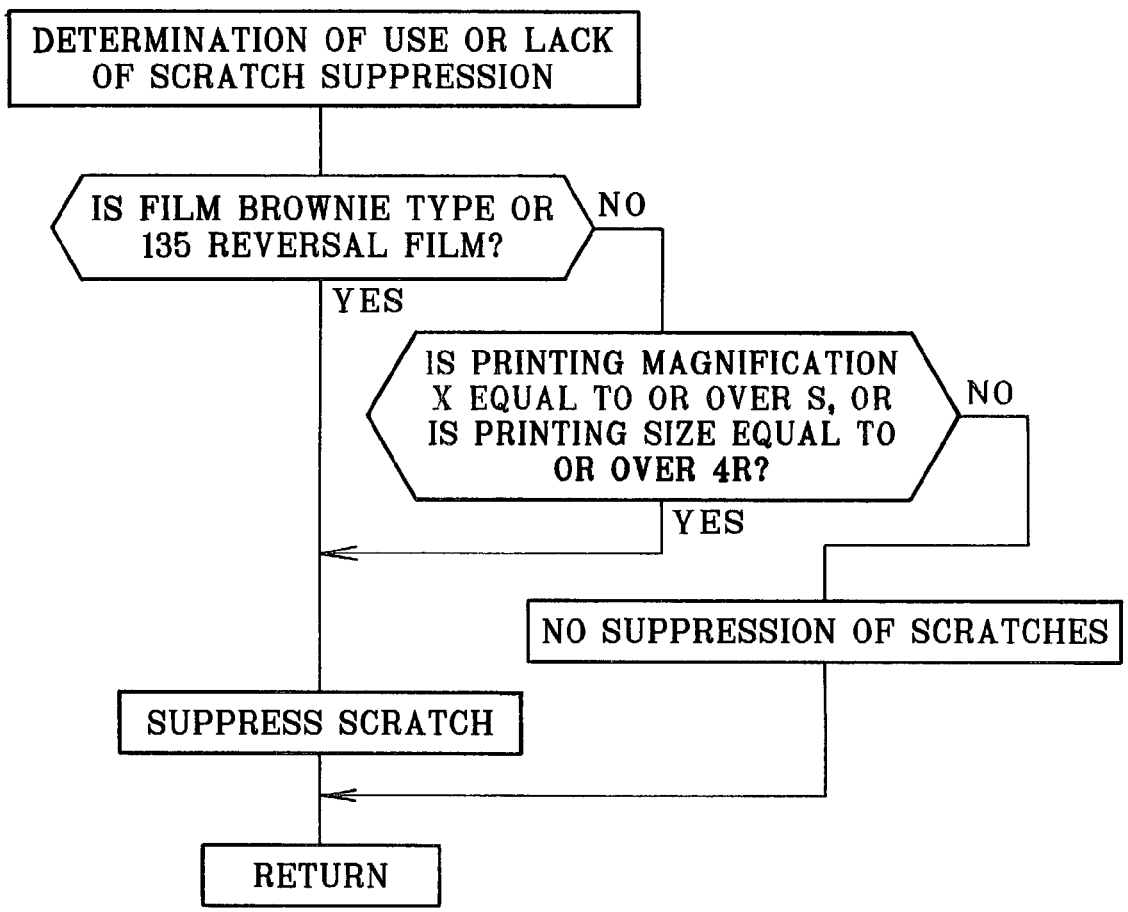
FIG. 4 is a flow chart illustrating a process of determining as to whether the scratch suppression is required.
FIG. 5 is a table illustrating plural levels of scratch suppression and printing sizes in using the photo film of 135 type is used.

The operation of the above construction is described with reference to FIGS. 3 and 4. At first, the photo film 38 is set in the photo film carrier 44. In the input panel 53, data of the type of the photo film 38, the printing size of image frames, and the printing magnification of those are input. It is checked in the scratch treatment determiner 55 whether or not the scratch suppressing process should be performed according to the conditions being input. For example, it is determined that the scratch suppressing process should be performed if the photo film is a Brownie film, or a reversal photo film of 135 type.

In the case of 135 type of negative photo film and the IX240 type of photo film, it is checked whether the suppression of scratches should be effected according to the printing magnification and printing size. It is determined to effect the scratch suppressing process if the printing magnification X is equal to or higher than a reference magnification S that is 4.5 times, or if the printing size is equal to or more than a postcard size (4R) of 102×152 mm. Note that, if a special printing mode is selected, then it is determined to use the scratch suppressing process irrespective of the photo film type, printing size and printing magnification. Examples of the special printing modes include the group photograph mode, the postcard mode, and the portrait photograph for personal identification.

When the image frame 60 to be read in the photo film 38 is set in the image reading position, the image frame 60 is pre-scanned at first. Pre-scanned image data is obtained, according to which an image reading condition at the fine scanning time is determined. The red, green and blue LEDs 21R, 21G and 21B are sequentially driven to emit light under the determined image reading condition. The photo film 38 is scanned by the fine scanning. After this, the IREDs 21IR are driven to emit infrared inspecting rays. Scratched portions 62 on a surface of the photo film 38 and dust in a light path are read photoelectrically by the area CCD 25. Three-color image data and IR image data are obtained by the area CCD 25, and sent to the image processor 12. The image processor 12 effects arithmetic operation of the scratch suppressing process, to designate inappropriate pixels caused by defects, scratched portion 62 and dust. Image data at the inappropriate pixels are corrected by use of pixels adjacent to those, for suppression of the scratches.

If the scratch treatment determiner 55 determines lack of use of the scratch suppressing process, then the frame image 60 is read in the fine scanning only by the red, green and blue LEDs 21R, 21G and 21B. Then the image data of the three colors are sent to the image processor 12, in which the image data are subjected to image processing. After the image processing, another image frame is read in the similar manner. Consequently, the image reading can be effective.

It is noted that, furthermore, a type of photographic paper to be used in printing can be considered as a condition for the scratch suppressing process. Specifically, the IREDs 21IR in the scratch suppressing process can be driven according to the fine scanning if the paper type is a high-quality type.

In the present embodiment, the red, green and blue LEDs 21R, 21G, 21B and the IREDs 21IR are arranged on the single board. Alternatively, a halogen lamp may be used for image reading. As disclosed in JP-A 2001-016413, a switching mirror can be used preferably. If an optical axis of the IREDs 21IR is perpendicular to that of the halogen lamp, the switching mirror can be slid or rotated as required. Because of this, image data obtained by light emission of the halogen lamp can be set equal to infrared image data obtained by infrared emission of the IREDs 21IR. In using the halogen lamp, it is possible to insert a first infrared cut filter and a second infrared cut filter alternately into a light path, the second infrared cut filter allowing passage of only infrared rays. Thus, the image data and the infrared image data can be obtained. Portion of each image frame at the inappropriate pixels are corrected according to the image data.

In the above embodiment, the pre-scanning and fine scanning are effected one after another while an image frame is positioned. Alternatively, plural image frames may be pre-scanned successively while the photo film is fed in a first direction. Then the image frames may be finely scanned successively while the photo film is fed in a second direction reverse to the first direction. In the above embodiment, the entirety of an image frame is read at one time by the area CCD 25. However, each image frame may be read partially by the area CCD 25. Portions of an image frame may be read one after another, to obtain image data after plural times of the partial reading steps. Also, a line CCD or image line sensor may be used for reading an image frame while the photo film is fed successively.

In the above embodiment, the scratch treatment determiner 55 determines one of only the use and lack of the scratch suppressing process. Furthermore, the level of the scratch suppressing process can be set high or low according to the printing size. In FIG. 5, an example of the scratch suppressing process for use with 135 type of photo film is illustrated. According to the example for a relationship between the printing size and the level of the scratch suppressing process, the scratch treatment determiner 55 determines that no suppression of the scratches is effected if the printing size is 89×127 mm or 102×152 mm. The scratch treatment determiner 55 determines a low level for the scratch suppression if the printing size is 127×178 mm, determines a middle level for the scratch suppression if the printing size is 204×254 mm, and determines a high level for the scratch suppression if the printing size is 254×304 mm.

In FIG. 6, an example of the scratch suppressing process for use with the IX240 type of photo film is illustrated. According to the example for a relationship between the printing size and the level of the scratch suppressing process, the scratch treatment determiner 55 determines that no suppression of the scratches is effected if the printing size is 89×127 mm or 102×152 mm. The scratch treatment determiner 55 determines a low level for the scratch suppression if the printing size is 89×254 mm, determines a middle level for the scratch suppression if the printing size is 204×254 mm, and determines a high level for the scratch suppression if the printing size is 254×304 mm. In FIG. 7, an example of the scratch suppressing process for use with 120 type of Brownie photo film is illustrated. According to the example for a relationship between the printing size and the level of the scratch suppressing process, the scratch treatment determiner 55 determines a middle level for the scratch suppression if the printing size is 102×152 mm or 127×178 mm, and determines a high level for the scratch suppression if the printing size is 204×254 mm, 254×304 mm or 304×406 mm. Therefore, the scratch suppression can be efficient because of the stepwise levels associated with plural printing sizes.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image reading device comprising:
    a light source for illuminating an image in an original by applying illuminating light thereto;
    an image sensor for reading said image by photoelectrically detecting said illuminating light reflected by, or transmitted through, said original, to obtain image data respectively of pixels;
    an input unit for inputting first information related to conditioning;
    a determiner for determining whether said first information satisfies a predetermined data correcting condition related to image data correction; and
    an image processor for extracting an inappropriate pixel group of inappropriate pixels from said pixels by checking said image data if said first information satisfies said data correcting condition, and for correcting said image data of said inappropriate pixel group if said first information satisfies said data correcting condition.

2. An image reading device as defined in claim 1, further comprising a controller for effecting calculation to obtain corrected image data for being used with said inappropriate pixel group according to said image data of appropriate pixels distinct from said inappropriate pixel group among said pixels.

3. An image reading device as defined in claim 2, wherein said first information is at least one of information of a type of said original, information of a printing size of said image, and information of a printing magnification of said image.

4. An image reading device as defined in claim 3, wherein said light source further applies inspecting rays to said image in said original;
    said image sensor photoelectrically detects said inspecting rays reflected by, or transmitted through, said original for each of said pixels, to obtain inspection image data;
    said image processor checks whether said inspection image data is appropriate or inappropriate for each of said pixels, and determines said inappropriate pixel group by specifying pixels associated with said inspection image data being inappropriate among said pixels.

5. An image reading device as defined in claim 4, wherein said image data associated with said inappropriate pixel group is corrected at a predetermined data correcting level, and said data correcting level is variable according to said first information.

6. An image reading device as defined in claim 5, wherein said data correcting level is higher according to largeness in said printing size of said image represented by said first information.

7. An image reading device as defined in claim 4, wherein said light source includes:
an illuminating light emitting section for applying said illuminating light to said original; and
an inspecting ray emitting section for applying said inspecting rays to said original.

8. An image reading device as defined in claim 7, wherein said original is a developed photo film, and said type is a photo film type.

9. An image reading device as defined in claim 8, wherein said inspecting ray emitting section includes plural infrared emitting diodes, and said inspecting rays are infrared rays.

10. An image reading device as defined in claim 9, wherein said printing magnification satisfies said data correcting condition when higher than a predetermined magnification, and said printing size satisfies said data correcting condition when larger than a predetermined size.

11. An image reading device as defined in claim 10, wherein said inappropriate pixel group is associated with a scratched portion of said original.

12. An image reading device as defined in claim 11, wherein said determiner checks whether said photo film type is a predetermined type, and thereafter checks whether said printing magnification or said printing size is higher than said predetermined magnification or said predetermined size.

13. An image reading method comprising:
reading an input condition for printing an image;
determining whether scratch suppression should be performed on the image based on the input condition;
obtaining pre-scan image data and determining a fine-scanning image reading condition based on the pre-scan image data;
fine-scanning the image based on the fine-scanning image reading condition;
calculating scratch suppression data if the scratch suppression should be performed on the image; and
correcting the image based on the scratch suppression data.

14. The image reading method according to claim 13, wherein the fine-scanning comprises finely scanning red, green and blue color data from the image, and if the scratch suppression should be performed on the image, the fine-scanning further comprises finely scanning infrared image data from the image.

15. The image reading method according to claim 13, wherein the determining whether scratch suppression should be performed on the image comprises:
determining a type of film used for the image;
determining a printing condition for printing the image;
determining whether scratch suppression should be performed based on the type of film and the printing condition.

16. The image reading method according to claim 15, wherein the type of film comprises at least one of Brownie film and 135 reversal film.

17. The image reading method according to claim 15, wherein the printing condition comprises at least one of a printing magnification and a printing size.

* * * * *